US011929531B2

(12) United States Patent
Yamaguchi et al.

(10) Patent No.: US 11,929,531 B2
(45) Date of Patent: Mar. 12, 2024

(54) COMPOSITE MEMBRANE

(71) Applicant: TEIJIN LIMITED, Osaka (JP)

(72) Inventors: Takeo Yamaguchi, Tokyo (JP); Yuhei Oshiba, Tokyo (JP); Hidenori Ohashi, Tokyo (JP); Jin Tomatsu, Tokyo (JP); Koji Furuya, Osaka (JP); Takao Ohno, Osaka (JP); Mami Nanbu, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 17/695,225

(22) Filed: Mar. 15, 2022

(65) Prior Publication Data

US 2022/0209272 A1    Jun. 30, 2022

Related U.S. Application Data

(62) Division of application No. 16/319,661, filed as application No. PCT/JP2017/020367 on May 31, 2017.

(30) Foreign Application Priority Data

Jul. 25, 2016   (JP) ................. 2016-145738

(51) Int. Cl.
*H01M 8/1062* (2016.01)
*B01D 69/10* (2006.01)
(Continued)

(52) U.S. Cl.
CPC ........ *H01M 8/1062* (2013.01); *B01D 69/107* (2022.08); *B01D 71/261* (2022.08);
(Continued)

(58) Field of Classification Search
CPC .... H01M 8/1062; H01M 8/106; B01D 69/10; B01D 2325/02; B01D 2325/34; B01D 2325/36; B25B 13/08
See application file for complete search history.

(56) References Cited

U.S. PATENT DOCUMENTS

| 4,849,311 A | 7/1989 | Itoh et al. |
| 2012/0028167 A1 | 2/2012 | Wang et al. |

(Continued)

FOREIGN PATENT DOCUMENTS

| EP | 2405517 A1 | 1/2012 |
| JP | 64-22932 A | 1/1989 |

(Continued)

OTHER PUBLICATIONS

International Search Report for PCT/JP2017/020367 dated Aug. 29, 2017 [PCT/ISA/210].

*Primary Examiner* — Adam A Arciero
(74) *Attorney, Agent, or Firm* — Sughrue Mion, PLLC

(57) ABSTRACT

A substrate for a composite membrane includes a microporous polyolefin membrane for carrying a hydrophilic resin compound within the pores of the microporous membrane wherein: the average pore diameter is 1 nm to 50 nm; the porosity is 50% to 78%; the membrane thickness is 1 μm to 12 μm; and, when a mixed solution of ethanol and water (volume ratio 1/2) is dripped onto a surface of the microporous polyolefin membrane which has not undergone hydrophilization treatment, the contact angle θ1 between the droplet and the surface is 0 to 90 degrees 1 second after the dripping, and the contact angle θ2 between the droplet and the surface is 0 to 70 degrees 10 minutes after the dripping, and the rate of change of the contact angle ((θ1−θ2)/θ1×100) is 10 to 50%.

9 Claims, 2 Drawing Sheets

(51) Int. Cl.
*B01D 71/26* (2006.01)
*C25B 13/08* (2006.01)
*H01M 8/106* (2016.01)

(52) U.S. Cl.
CPC .......... *B01D 71/262* (2022.08); *C25B 13/08* (2013.01); *H01M 8/106* (2013.01); *B01D 2323/12* (2013.01); *B01D 2325/0283* (2022.08); *B01D 2325/04* (2013.01); *B01D 2325/24* (2013.01); *B01D 2325/341* (2022.08); *B01D 2325/36* (2013.01)

(56) References Cited

U.S. PATENT DOCUMENTS

| | | |
|---|---|---|
| 2013/0011716 A1 | 1/2013 | Sano et al. |
| 2013/0171498 A1* | 7/2013 | Hsing ............... H01M 10/4235 |
| | | 429/249 |
| 2013/0233529 A1 | 9/2013 | Harada et al. |
| 2013/0236767 A1* | 9/2013 | Nishikawa .......... H01M 50/491 |
| | | 156/60 |
| 2016/0082397 A1 | 3/2016 | Ohno et al. |
| 2021/0288341 A1 | 9/2021 | Yamaguchi et al. |

FOREIGN PATENT DOCUMENTS

| | | |
|---|---|---|
| JP | 1-158051 A | 6/1989 |
| JP | 1-186752 A | 7/1989 |
| JP | 8-88013 A | 4/1996 |
| JP | 8-141013 A | 6/1996 |
| JP | 2005-166557 A | 6/2005 |
| JP | 2008-32390 A | 2/2008 |
| JP | 2010-53245 A | 3/2010 |
| JP | 2011-241361 A | 12/2011 |
| JP | 2014-61505 A | 4/2014 |
| JP | 2014-217800 A | 11/2014 |
| JP | 2014-218563 A | 11/2014 |
| WO | 2011/118735 A1 | 9/2011 |
| WO | 2014/181761 A1 | 11/2014 |

* cited by examiner

COMPOSITE MEMBRANE

CROSS REFERENCE TO RELATED APPLICATIONS

This application is a divisional of application Ser. No. 16/319,661 filed Jan. 22, 2019, which is a National Stage of International Application No. PCT/JP2017/020367, filed on May 31, 2017, which claims priority from Japanese Patent Application No. 2016-145738, filed on Jul. 25, 2016. The disclosure of application Ser. No. 16/319,661 is incorporated herein by reference in its entirety.

FIELD

The present invention relates to a substrate for a composite membrane.

BACKGROUND

Substrates for composite membranes are support materials (support body) to which a function that is not provided in the substrate itself is added by means of the application, bonding, lamination, impregnation, or loading of a specific material and include, for example, non-woven fabrics made from polyester or polyolefin, non-porous resin films as typified by polyester films, or porous films as typified by porous polyolefin resin films.

Composite membranes, in which a waterproof functional layer is formed on a porous substrate made of paper with natural pulp as the main ingredient, non-woven fabrics made from a polymeric material, or a porous polymer film, have been devised for moisture permeable water proof membranes that are permeable to water vapor (moisture) while blocking the passage of liquid water and are used as materials to prevent clamminess in, for example, clothing or special protective clothing, and sanitary goods, (e.g., disposable diapers). As a material for sanitary goods, for example, Patent Literature 1 discloses a material made by laminating a polyolefin-based synthetic resin membrane onto a material such as a non-woven fabric made from polypropylene which has favorable gas permeability and moisture permeability. Furthermore, for example, in Patent Literature 2, a moisture permeable waterproof membrane with gas barrier properties, moisture permeability, and thinness is achieved by providing a hydrophilic resin coating layer on a porous polyolefin membrane.

Moreover, for example, for a polymer electrolyte of a fuel cell, as proposed in Patent Literature 3, by including a polymer electrolyte in voids (pores) of a porous polymer membrane, an improvement in mechanical strength is achieved that could not be attained by the electrolyte itself. Furthermore, for example, Patent Literature 4 proposes a porous substrate suitable for holding a polymer electrolyte within a porous polyethylene membrane. Patent Literature 5 discloses a thin electrolyte membrane with excellent dynamic strength obtained by the uptake and incorporation of an ion exchange resin into a thin, porous, very high molecular weight polyolefin membrane mesh structure. Patent Literature 6 discloses a thin electrolyte membrane with excellent dynamic strength obtained by the uptake and incorporation of an ion conductive body into a solid porous polymer membrane using capillary condensation action.

Furthermore, for example, in a total heat exchange element, a supply path and a discharge path are formed into individual paths by providing a separation plate or a separation membrane therebetween. In relation to such heat exchange elements, Patent Literature 7 achieves a resin total heat exchange element provided with gas barrier properties and moisture permeable properties by providing a separation plate by forming a water-insoluble porous membrane comprising a water-insoluble hydrophilic moisture permeable resin having gas barrier properties on a porous substrate (non-woven fabric) such as a non-woven fabric.

Recently, composite membranes in which a hydrophilic resin compound, etc., is impregnated (loaded) into the fine pores of a porous polyolefin membrane have been proposed which are used in various applications such as the moisture permeable water proof membranes and fuel cell polymer electrolytes mentioned above. In order to impregnate (load) the porous polyolefin membrane with a hydrophilic resin, a method involving the impregnation of an aqueous solution of a hydrophilic resin compound dissolved in water into the porous polyolefin membrane is typical. For example, various methods of impregnating an electrolyte solution into a porous membrane with pores to obtain a proton conductive membrane have been proposed, and Patent Literature 8 proposes impregnating a porous polymer membrane with an electrolytic solution comprising a phosphate and an organic solvent to obtain a thin membrane electrolyte for a room temperature fuel cell.

However, in porous membranes made from hydrophobic resins typified by polyolefin, if hydrophilization treatment is not implemented on the porous membrane, water repellency of the porous membrane is great in the above method, and as aqueous solutions of a hydrophilic resin compound (e.g., the electrolyte) are repelled, aqueous solutions of the hydrophilic resin compound do not permeate the porous membrane and so the hydrophilic resin compound cannot be loaded into the porous membrane.

Methods for loading a porous polyolefin membrane with an aqueous solution of a hydrophilic resin compound include: hydrophilization pretreatment of the porous membrane; reducing the surface free energy of the aqueous solution of a hydrophilic resin compound; increasing the pore diameter and porosity of the porous polyolefin membrane; and loading the aqueous solution of a hydrophilic resin compound under a high-pressure atmosphere or a low-pressure atmosphere.

Methods of applying hydrophilization treatment to the porous membrane include: chemical surface treatment (applying a surfactant onto the porous membrane, etc., (e.g., Patent Literature 9)); physical surface treatment (e.g., plasma treatment or corona treatment); and moisture pretreatment with an alcohol and the like. However, for chemical surface treatment, problems including the mixing of unwanted substances such as a surfactant into the hydrophilic resin compound in the porous polyolefin membrane may occur, in addition to an increase in production costs. As degradation of the porous polyolefin membrane (cleavage of polymer strands) due to the treatment occurs in the case of physical surface treatment, problems including weakening of the porous membrane itself and a decrease in dynamic strength arise. In particular, the thinner the porous polyolefin membrane is, the more serious the decrease in dynamic strength. Furthermore, the smaller the pore diameter of the porous polyolefin membrane, the harder it is for the hydrophilic treatment effect to fully reach the interior of the porous membrane. As the interior of the porous polyolefin membrane is soaked in an alcohol in wetting pretreatment with an alcohol, problems such as unnecessary alcohol being mixed into the hydrophilic resin compound and hindering of the permeation of the aqueous solution of the hydrophilic resin compound arise. In order to solve these problems, it is necessary to provide a substrate that can be impregnated with an aqueous solution of a hydrophilic resin compound without applying the aforementioned hydrophilic treatment.

Methods for reducing the surface free energy of an aqueous solution of a hydrophilic resin compound include adding alcohol to the aqueous solution of a hydrophilic resin compound, and by lowering the surface free energy, impregnation into the porous polyolefin membrane is facilitated. However, if the alcohol concentration within the aqueous solution increases, the solubility of the hydrophilic resin compound decreases, and the concentration of the resin compound cannot be sufficiently maintained, further problems include the environmental load that is involved during production. In order to solve such problems, a substrate which can be impregnated with a solvent having a low alcohol concentration is required.

Methods for increasing the pore diameter or porosity of the porous polyolefin membrane include methods in which a foaming agent is added during the production of the porous polyolefin membrane to actively increase or enlarge the pores, or methods in which the amount blended of a nucleating agent, which become the pores, is increased. However, if such production methods are adopted, there are problems such as a significant reduction in dynamic strength of the porous polyolefin membrane itself leading to deterioration in productivity due to membrane tearing during production. Furthermore, even if porous polyolefin membranes could be produced, there is the same problem of membrane tearing in the step of impregnation with an aqueous solution of a hydrophilic resin compound. Moreover, there is the problem of the hydrophilic resin peeling or coming off the porous polyolefin membrane after the solvent has been removed after impregnation with the aqueous solution. In order to solve such problems, it is necessary to increase the surface area of the polyolefin, which is the porous membrane material, in contact with the hydrophilic resin, and furthermore it is necessary to provide a substrate in which the hydrophilic resin can be finely dispersed into the polyolefin porous membrane to the maximum extent to increase local homogeneity (equivalent porosity but more microporous).

Problems that occur in methods for loading an aqueous solution of a hydrophilic resin compound under a high-pressure environment or a low-pressure environment include complicated production processes leading to increased costs, as well as tearing of the membrane during production, and loading deficiencies of the aqueous solution of a hydrophilic resin compound. In order to address these problems, it is necessary to provide a substrate into which an aqueous solution of a hydrophilic resin compound can permeate under atmospheric pressure.

CITATION LIST

Patent Literature

[PTL 1] Japanese Unexamined Patent Publication (Kokai) No. H08-141013
[PTL 2] Japanese Unexamined Patent Publication (Kokai) No. 2014-61505
[PTL 3] Japanese Unexamined Patent Publication (Kokai) No. 2005-166557
[PTL 4] Japanese Unexamined Patent Publication (Kokai) No. 2011-241361
[PTL 5] Japanese Unexamined Patent Publication (Kokai) No. 64-22932
[PTL 6] Japanese Unexamined Patent Publication (Kokai) No. H1-158051
[PTL 7] Japanese Unexamined Patent Publication (Kokai) No. 2008-032390
[PTL 8] Japanese Unexamined Patent Publication (Kokai) No. H08-88013
[PTL 9] Japanese Unexamined Patent Publication (Kokai) No. H01-186752

SUMMARY

Technical Problem

The object of the present invention is to provide a substrate for a composite membrane comprising a microporous polyolefin membrane the pores of which can be satisfactorily loaded with a hydrophilic resin compound and which has favorable permeability to an aqueous solution with a high water concentration and a comparatively high surface free energy, without hydrophilization pretreatment being carried out thereon.

Solution to Problem

In order to solve the above problems, according to the present invention, the following configurations are adopted.

[1] A substrate for a composite membrane comprising a microporous polyolefin membrane for carrying a hydrophilic resin compound within pores of the microporous membrane wherein: the average pore diameter is 1 nm to 50 nm; the porosity is 50% to 78%; the membrane thickness is 1 μm to 12 μm; and, when a mixed solution of ethanol and water (volume ratio 1/2) is dripped onto a surface of the microporous polyolefin membrane which has not undergone hydrophilization treatment, a contact angle θ1 between the droplet and the surface is 0 to 90 degrees 1 second after the dripping, and a contact angle θ2 between the droplet and the surface is 0 to 70 degrees 10 minutes after the dripping, and a rate of change of the contact angle (($\theta$1−$\theta$2)/$\theta$1×100) is 10 to 50%.

[2] The substrate for a composite membrane according to [1], wherein the rate of change of the contact angle (($\theta$1−$\theta$2)/$\theta$1×100) is 17 to 41%.

[3] The substrate for a composite membrane according to [1] or [2], wherein the polyolefin is a polyethylene composition comprising a high molecular weight polyethylene with a mass-average molecular weight of 900,000 or more and a low molecular weight polyethylene with a mass-average molecular weight of 200,000 to 800,000 mixed at a mass ratio of 20:80 to 80:20.

[4] The substrate for a composite membrane according to any one of [1] to [3], wherein the substrate for a composite membrane can be impregnated with a liquid which is a solvent for the hydrophilic resin compound and has a surface free energy of 35 to 36.5 mJ/m$^2$.

[5] The substrate for a composite membrane according to [4], wherein the substrate for a composite membrane can be impregnated with a mixed solution of ethanol and water in which the water concentration is greater than 65.8% by volume but no greater than 70.6% by volume.

[6] The substrate for a composite membrane according to any one of [1] to [5], wherein the Gurley value as measured according to JIS P8117 is 90 s/100 cc or less.

[7] The substrate for a composite membrane according to any one of [1] to [6], wherein the tensile breaking strength (MD or TD) per unit cross sectional area of the polyolefin solid content is 50 MPa or more.

Advantageous Effects of Invention

According to the present invention a substrate for a composite membrane comprising a microporous polyolefin membrane the pores of which can be satisfactorily loaded with a hydrophilic resin compound and which has favorable permeability to an aqueous solution with a high water concentration and a comparatively high surface free energy, without hydrophilization pretreatment being carried out thereon can be provided.

DESCRIPTION OF EMBODIMENTS

Figure 1:
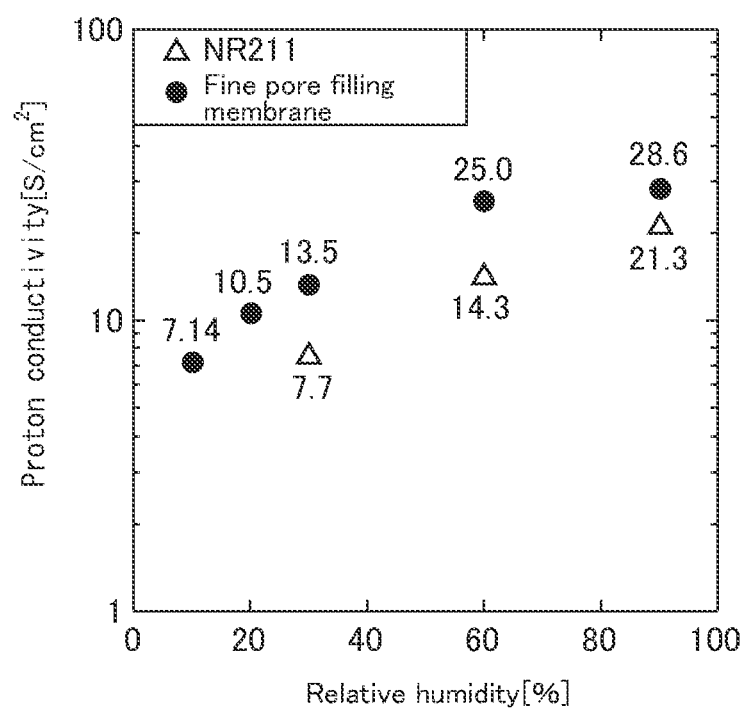
FIG. 1 is a graph comparing the relative humidity dependency of proton conductivity of a Membrane Electrode Assembly (MEA) that uses the substrate for a composite membrane of the present invention, and a conventional electrolyte membrane.

The following embodiments of the present invention will be described in order. These explanations and embodiments are for exemplifying the invention and do not limit the scope of the invention. Note that, in the entire description, numerical ranges expressed by "to" include the upper value and lower value. Further, with regard to the microporous polyolefin membrane, "longitudinal direction" refers to the direction of the length of the microporous polyolefin membrane that is produced in an elongated shape, and "transverse direction" refers to a direction that is perpendicular to the longitudinal direction of the microporous polyolefin membrane. Below, "transverse direction" may be referred to as "TD" and the "longitudinal direction" may be referred to as "MD".

[Substrate for Composite Membrane]

The substrate for a composite membrane of the present invention comprises a microporous polyolefin membrane and is for carrying a hydrophilic resin compound within the pores of the microporous membrane wherein the average pore diameter is 1 nm to 50 nm, the porosity is 50% to 78%, the membrane thickness is 1 μm to 12 μm, and when a mixed solution of ethanol and water (volume ratio 1/2) is dripped onto a surface of the microporous polyolefin membrane which has not undergone hydrophilization treatment, a contact angle θ1 between the droplet and the surface is 0 to 90 degrees 1 second after the dripping, and a contact angle θ2 between the droplet and the surface is 0 to 70 degrees 10 minutes after the dripping, and a rate of change of the contact angle $((θ1−θ2)/θ1×100)$ is 10 to 50%. The details of each configuration will be explained below.

(Average Pore Diameter)

The average pore diameter of the microporous polyolefin membrane which is a substrate for a composite membrane of the present invention is 1 nm to 50 nm. When the average pore diameter of the microporous polyolefin membrane is 50 nm or less, even if the porosity of the microporous membrane is high, the microporous polyolefin membrane becomes favorable in terms of dynamic strength, and handleability is improved. Furthermore, for a given porosity, the smaller the average pore diameter the greater the frequency of pores present in the microporous membrane, which allows even loading of the hydrophilic resin compound over the entire porous polyolefin membrane. Furthermore, as the frequency of pores present over the surface of the microporous membrane increases, the more favorable the permeability to solvents used for the hydrophilic resin compound which have a higher surface free energy. From such a viewpoint, it is preferable for the microporous polyolefin membrane to have an average pore diameter of 45 nm or less, and more preferably 40 nm or less. When the average pore diameter is 1 nm or more, the permeation speed of solvents with a high surface free energy is improved. From such a viewpoint, it is preferable for the microporous polyolefin membrane to have an average pore diameter of 5 nm or more, and more preferably 10 nm or more.

The average pore diameter of the microporous polyolefin membrane can be measured by the methods described in the examples below.

(Porosity)

The microporous polyolefin membrane which is a substrate for a composite membrane of the present invention has a porosity of 50 to 78%. A porosity of 50% or more is desirable for the microporous polyolefin membrane because the loading rate of the hydrophilic resin compound becomes high and the properties of the resin compound itself can be sufficiently expressed, and also because permeation of a solution, in which the hydrophilic resin compound is dissolved, into the microporous membrane is facilitated and the rate of permeation is accelerated. From such a viewpoint, a microporous polyolefin membrane porosity of 55% or more is preferable, and more preferable is 60% or more. On the other hand, when the porosity is 78% or less, the dynamic strength of the microporous polyolefin membrane becomes favorable which is desirable in terms of improved handleability. From such a viewpoint, a microporous polyolefin membrane porosity of 75% or less is preferable, and more preferable is 66% or less.

The porosity (ε) of the microporous polyolefin membrane can be measured by the measuring methods described below in the Examples and is calculated with the following formula.

$$ε(\%)=\{1-Ws/(ds·t)\}×100$$

Ws: weight of microporous polyolefin membrane (g/m$^2$)
ds: true density of polyolefin (g/cm$^3$)
t: thickness of microporous polyolefin membrane (μm)

(Membrane Thickness)

The microporous polyolefin membrane which is a substrate for a composite membrane of the present invention has a thickness of 1 μm to 12 μm. When the thickness of the microporous polyolefin membrane is 1 μm or more, sufficient dynamic strength can be easily attained, making it desirable in terms of handleability during the processing of the microporous polyolefin membrane or in terms of allowing stable transportation thereof when impregnating the solution of the dissolved hydrophilic resin compound. From such a viewpoint, it is preferable for the microporous polyolefin membrane to be 3 μm or more, and more preferably 4 μm or more. On the other hand, if the thickness is 12 μm or less, the time required for impregnation of the solution of dissolved hydrophilic resin compound into the microporous membrane becomes shorter, and the hydrophilic resin compound can be loaded evenly without any patches over the entire microporous membrane. Moreover, when the substrate impregnated with the hydrophilic resin compound is modularized, the efficiency per volume is desirably improved. From such a viewpoint, a microporous polyolefin membrane thickness of 10 μm or less is preferable, and more preferable is 9 μm or less.

In general, microporous polyolefin membranes are opaque and white due to dispersion of light by the presence of pores. However, as the pores are substantially loaded with a hydrophilic resin compound solution, light dispersion is reduced, and with the combined effect of the thin membrane thickness, the obtained composite membrane sometimes becomes substantially transparent over the entirety thereof
(Contact Angle)

For the microporous polyolefin membrane which is a substrate for a composite membrane of the present invention, when a mixed solution of ethanol and water (volume ratio 1/2) is dripped onto a surface of the microporous polyolefin membrane which has not undergone hydrophilization treatment, the contact angle between the droplet and the surface is 0 to 90 degrees 1 second after the dripping. When the contact angle after 1 second is 90 degrees or less, there is a synergistic effect with the porous structure having the above porosity and average pore diameter such that permeation of the solution of dissolved hydrophilic resin compound into the microporous membrane is facilitated. From such a viewpoint, a contact angle after 1 second of 88 degrees or less is preferable, and more preferable is 85 degrees or less.

Furthermore, for the microporous polyolefin membrane which is a substrate for a composite membrane of the present invention, when a mixed solution of ethanol and water (volume ratio 1/2) is dripped onto a surface of the microporous polyolefin membrane which has not undergone hydrophilization treatment, it is desirable that the contact angle between the droplet and the surface is 0 to 70 degrees 10 minutes after the dripping. When the contact angle of the microporous polyolefin membrane is 70 degrees or less, the solution of dissolved hydrophilic resin compound can more easily permeate the microporous membrane, making it desirable in terms of sufficiently loading the microporous membrane with the compound. From such a viewpoint, a contact angle after 10 minutes of 65 degrees or less is preferable, and more preferable is 60 degrees or less.

The contact angle can be measured using the measurement methods described below in the examples.

Note that, when the ethanol-water solution is dripped on the microporous polyolefin membrane of the present invention, the droplet does not spread outward in the radial direction, but rather the droplet exhibits the behavior of maintaining the diameter thereof or shrinking inward in the radial direction when permeating the membrane.
(Rate of Change of Contact Angle)

The microporous polyolefin membrane according to the present invention can also be defined from the viewpoint of the change over time of the contact angle. Namely, when a mixed solution of ethanol and water (volume ratio 1/2) is dripped onto a surface of the microporous polyolefin membrane which has not undergone hydrophilization treatment, it is desirable that a contact angle θ1 between the droplet and the surface be 0 to 90 degrees 1 second after the dripping, and a contact angle θ2 between the droplet and the surface be 0 to 70 degrees 10 minutes after the dripping, and a rate of change of the contact angle ((θ1−θ2)/θ1×100) be 10 to 50%. When the rate of change of the contact angle is 10% or more, it is considered that the impregnation rate of the electrolyte solution into the microporous polyolefin membrane is sufficient from the viewpoint of practical production efficiency. From such a viewpoint, it is preferable for the rate of change of contact angle to be 15% or more, more preferably 17% or more. On the other hand, from the viewpoint of maintaining sufficient dynamic strength of the microporous polyolefin membrane, it is preferable for the rate of change of the contact angle to be 45% or less, more preferably 41% or less.

The present invention has an extremely small average pore diameter of 1 nm to 50 nm as well as a comparatively high porosity of 50% to 78%, and has achieved an extremely thin membrane thickness of 1 μm to 12 μm. Such a microporous polyolefin membrane could not conventionally be obtained. Furthermore, by combining the aforementioned surface properties of the contact angle between the droplet and the surface being 0 to 90 degrees 1 second after the dripping, the contact angle between the droplet and the surface being 0 to 70 degrees 10 minutes after the dripping, and the rate of change of the contact angle being 10 to 50%, the permeability to an aqueous solution with a high water concentration and surface free energy becomes a favorable level that could not be conventionally achieved, and thereby a high concentration of hydrophilic resin compound can be loaded into the pores.

Note that in the present invention, it is necessary to adjust the average pore diameter, porosity, and contact angle of the aforementioned microporous polyolefin membrane substrate to a suitable range. The means by which these physical properties are controlled is in no way limited. However, production conditions can be adjusted for: the average molecular weight of the polyethylene resin; the mixing ratio when a plurality of polyethylene resins are mixed and used; the polyethylene resin concentration in the raw material; the mixing ratio of solvents mixed into the raw material when a plurality thereof are mixed and used; the stretch ratio and the heat treatment (heat setting) temperature after stretching; and the soaking time in an extraction solvent, etc. In particular, as will be indicated in the production method below, it is preferable that: the mass ratio of a high molecular weight polyethylene in the entire polyethylene composition be 20 to 80% by mass; that the polyethylene resin in the raw material comprise 5% by mass or more of a high molecular weight polyethylene with a mass-average molecular weight of 900,000 or more; that a mixture of a volatile solvent and a nonvolatile solvent be used as a solvent of the polyolefin solution (content of nonvolatile solvent in the whole solvent being 80 to 98% by mass); that the stretch ratio of the entirety be a ratio of 45 to 100; and that the heat setting temperature be 120 to 135° C.
(Surface Free Energy of Liquid that can be Used for Impregnation)

The microporous polyolefin membrane which is a substrate for a composite membrane according to the present invention can be impregnated with liquid that is a hydrophilic resin compound solvent with a surface free energy of 35 to 36.5 mJ/m$^2$. The surface free energy of a liquid as used herein is a value measured at 20° C.

When the surface free energy of this liquid is 36.5 mJ/m$^2$ or less, the affinity between the solvent that dissolves the hydrophilic resin compound and the polyolefin resin that forms the microporous membrane becomes higher which is desirable from the point that it is easier for the solution in which the hydrophilic resin compound has dissolved to permeate the microporous membrane. Moreover, when the surface free energy is 35 mJ/m$^2$ or more, the concentration of the hydrophilic resin compound in the solvent can be increased, which is desirable from the point of increasing the loading efficiency of the hydrophilic resin into the microporous membrane. Note that, the surface free energy can be set to the aforementioned range by, for example, using a mixed solution of an alcohol (e.g., methanol, ethanol, isopropanol, or t-butyl alcohol) and water, or a mixed solvent obtained by mixing an organic solvent such as ethylene glycol, tetrahydrofuran, acetone, methyl ethyl ketone, dimethylformamide, triethylamine, etc., with water in a required range.

Note that a method for adjusting the surface free energy of the aforementioned liquids can be achieved by, for example, mixing a volume ratio of ethanol of 29.5% by volume or more and less than 34.2% by volume into water (namely, the water concentration is more than 65.8% by volume but not more than 70.5% by volume).

(Hydrophilic Resin Composition)

A resin compound that is soluble in a liquid with a surface free energy of 35 to 36.5 mJ/m$^2$ can be used as the hydrophilic resin compound that is suitably carried by the microporous polyolefin membrane which is a substrate for a composite membrane according to the present invention. For example, as the hydrophilic resin compound a polymer with hydrophilic groups such as a sulfonic acid group, carboxyl group, or hydroxyl group is preferable. More specific examples include, perfluorosulfonic acid type resins, polyvinyl pyrrolidone, polyvinyl alcohol, polyethylene glycol, polyacrylic acid, polymethacrylic acid, polystyrenesulfonic acid, celluloses and the like. A modified compound of the resin compound or a dispersion of fine aggregates of the resin compound, for example, may be used provided the compound does not become only sparingly soluble when the aforementioned liquid is used to prepare an aqueous solution of the hydrophilic resin compound. These hydrophilic resin compounds are preferred because they have high solubility in a solvent containing water so that impregnation of the resin compound into the microporous polyolefin membrane can be efficiently performed and the resin compound does not peel off or fall off from the microporous polyolefin membrane after impregnation and can be carried well.

(Gurley Value)

The microporous polyolefin membrane which is a substrate for a composite membrane according to the present invention has a Gurley value, as measured according to JIS P8117, of preferably 90 s/100 cc or less, more preferably 85 s/100 cc or less, and even more preferably of 75 s/100 cc or less. When this Gurley value is 90 s/100 cc or less, the solution in which the hydrophilic resin compound is dissolved permeates the microporous membrane more easily which is desirable from the point that the impregnation speed becoming faster.

(Tensile Breaking Strength)

The microporous polyolefin membrane which is a substrate for a composite membrane of the present invention has a tensile breaking strength in at least one of the longitudinal direction (MD) and the transverse direction (TD) of preferably 50 MPa or more, and more preferably 60 MPa or more. When the strength of the microporous polyolefin membrane is 50 MPa or more, the dynamic strength for the composite membrane becomes favorable and the point that the handleability improves in the step of impregnating the microporous polyolefin membrane with an aqueous solution of hydrophilic resin compound is desirable.

(Polyolefin)

The microporous polyolefin membrane which is a substrate for a composite membrane according to the present invention is a microporous membrane composed of polyolefin. The microporous membrane has many micropores therein and has a structure wherein these micropores are interconnected, meaning that gas or liquid can pass from one surface to the other surface. It is preferable for the microporous polyolefin membrane to comprise polyolefin at 90% by mass or more, more preferably 95% by mass or more and the remainder may include additives such as organic or inorganic fillers or surfactants in amounts limited so as not to influence the effects of the invention.

The polyolefin may be, for example, a homopolymer or a copolymer of polyethylene, polypropylene, polybutylene, or polymethylpentene, or may be a mixture of one or more thereof, and among these, polyethylene is preferable. Low molecular weight polyethylene or a mixture of low molecular weight polyethylene and high molecular weight polyethylene is suitable as the polyethylene. Furthermore, polyethylene may be used in combination with another component. Examples of components other than polyethylene include polypropylene, polybutylene, polymethylpentene, and a copolymer of polypropylene and polyethylene. The polyolefin may be a combination of a plurality of polyolefins having poor compatibility with each other, having different degrees of polymerization and branching properties, in other words, a plurality of polyolefins having different crystallinity, stretching properties and molecular orientation.

The polyolefin used in the present invention is preferably a polyethylene composition comprising 5% by mass or more of a high molecular weight polyethylene with a mass-average molecular weight of 900,000 or more, more preferably a composition comprising 7% by mass or more of the high molecular weight polyethylene, and particularly a composition comprising 15 to 90% by mass of the high molecular weight polyethylene. Moreover, blending a suitable amount of two or more types of polyethylene has the effect of forming a network structure that accompanies fibrillation upon stretching and increasing the pore generation rate. The mass-average molecular weight after blending two or more types of polyethylene is preferably 500,000 to 4,500,000, more preferably 500,000 to 4,000,000. In particular, a polyethylene composition comprising a blend of the aforementioned high molecular weight polyethylene with a mass-average molecular weight of 900,000 or more and a low molecular weight polyethylene with a mass-average molecular weight of 200,000 to 800,000 is preferable. In such cases, it is particularly preferable for the ratio of the high molecular weight polyethylene in the polyethylene composition to be 20 to 80% by mass. The density of the low molecular weight polyethylene is preferably 0.92 to 0.96 g/cm$^3$. The upper limit value of the mass-average molecular weight of the high molecular weight polyethylene is preferably 6,000,000 or less, and 5,000,000 or less is particularly preferable. The lower limit value of the mass-average molecular weight of the high molecular weight polyethylene is preferably 1,000,000 or more, more preferably 2,000,000 or more, and 3,000,000 or more is particularly preferable.

Note that the mass-average molecular weight was determined by dissolving a sample of the microporous polyolefin membrane in o-dichlorobenzene by heating and measuring the sample by GPC (Alliance GPC 2000, GMH 6-HT and GMH 6-HTL columns, manufactured by Waters) at a column temperature of 135° C. and a flow rate of 1.0 mL/min. Molecular weight monodisperse polystyrene (manufactured by Tosoh Corporation) may be used for calibrating the molecular weight.

(Method for Producing Microporous Polyolefin Membrane)

The microporous polyolefin membrane which is a substrate for a composite membrane of the present invention can be favorably produced by the method indicated below. That is, by sequentially implementing the following steps the membrane can be favorably produced.

(I) A step of preparing a solution containing a polyolefin composition and a solvent, wherein the solution contains at least a volatile solvent having a boiling point of less than 210° C. at atmospheric pressure.

(II) A step of melt-kneading the solution, extruding the melt-kneaded product from a die, cooling and solidifying to obtain a gel-like molded product.

(III) A step of stretching the gel-like molded product in at least one direction.

(IV) A step of extracting and washing the solvent from the inside of the stretched intermediate molded product.

In step (I) a solution containing the polyolefin composition and a solvent is prepared, and a solution is prepared that contains at least a volatile solvent with a boiling point of less than 210° C. at atmospheric pressure. The solution is preferably a thermo-reversible sol-gel solution, that is, the polyolefin is solated by heating and dissolving in the solvent thereby preparing a thermo-reversible sol-gel solution. The volatile solvent with a boiling point of less than 210° C. at atmospheric pressure in step (I) is not particularly limited provided sufficient swelling or solvation of the polyolefin can be caused thereby. However, liquid solvents such as tetralin, ethylene glycol, decalin, toluene, xylene, diethyl triamine, ethylenediamine, dimethyl sulfoxide, hexane and the like are preferred, and these solvents may be used alone or in combination of two or more. Thereamong, decalin and xylene are preferred.

Furthermore, other than the aforementioned volatile solvent with a boiling point of less than 210° C. at atmospheric pressure, when preparing this solution, the inclusion of a nonvolatile solvent having a boiling point of 210° C. or more such as liquid paraffin, paraffin oil, mineral oil, castor oil or the like is preferable in terms of facilitating the adjustment of average pore diameter and porosity to within the range of the present invention. In such cases, it is preferable for the content of the nonvolatile solvent to be 80 to 98% by mass of the whole solvent.

In the solution of step (I), from the viewpoint of controlling the loading rate of the resin composition into the microporous polyolefin membrane substrate, it is preferable for the concentration of the polyolefin composition to be 10 to 35% by mass, more preferably 15 to 30% by mass.

In step (II), the solution prepared in the step (I) is melt-kneaded, the obtained melt-kneaded product is extruded through a die and cooled and solidified to obtain a gel-like molded product. Preferably, an extrudate is obtained by extruding through the die at a temperature range from the melting point of the polyolefin composition to the melting point+65° C., then the extrudate is cooled to obtain a gel-like molded product.

It is preferable to form the molded product into a sheet shape. Cooling may involve quenching in an aqueous solution or an organic solvent or casting with a cooled metal roll, but in general, a method of quenching in water or the volatile solvent used at the time of the sol-gel solution is used. The cooling temperature is preferably 10 to 40° C. Note that it is preferable to prepare the gel-like sheet by providing a water stream on the surface layer of a water bath so that the mixed solution released from the sheet, which gellified in the water bath, and floating on the water surface does not adhere again to the sheet.

In step (II), one or more stages of preliminary heating may be carried out after the gel-like molded product is cooled as required, and some of the volatile solvent may be removed from the inside of the sheet. In such cases, the preliminary heating temperature is preferably 50 to 100° C.

Step (III) is a step of stretching the gel-like molded product in at least one direction. The stretching in step (III) is preferably biaxial stretching, and either sequential biaxial stretching in which longitudinal stretching and transverse stretching are separately carried out, or simultaneous biaxial stretching in which longitudinal stretching, and transverse stretching are simultaneously carried out can be suitably applied. Further, a method of stretching in the transverse direction after stretching a plurality of times in the longitudinal direction, a method of stretching in the longitudinal direction and stretching a plurality of times in the transverse direction, and a method of sequential biaxial stretching followed by further stretching one or more times in the longitudinal direction and/or the transverse direction are also favorable.

The area stretch ratio (the product of the longitudinal stretch ratio and the transverse stretch ratio) in step (III), from the viewpoint of controlling the permeability of a mixed solution of ethanol and water (volume ratio 1/2) into the microporous polyolefin membrane, is preferably a ratio of 45 to 100, and more preferably a ratio of 50 to 91. The stretching temperature is preferably 90 to 110° C.

In addition to the stretching step (III), thermal fixing treatment may be performed as necessary. In such cases, the heat setting temperature is preferably 120 to 135° C. from the viewpoint of controlling the loading rate of the resin compound into the microporous polyolefin membrane substrate.

Step (IV) is a step of extracting and washing the solvent from the inside of the stretched intermediate molded product. In step (IV), in order to extract the solvent from the inside of the stretched intermediate molded product (stretched film), it is preferable to perform washing with a halogenated hydrocarbon such as methylene chloride or a hydrocarbon solvent such as hexane. It is preferable to take 20 to 180 seconds when washing by immersing in a tank containing a solvent in order to obtain a microporous polyolefin membrane from which less residual solvent is eluted. Furthermore, in order to further improve the cleaning effect, tanks are divided into a plurality of stages, a washing solvent is poured in from the downstream side of the microporous polyolefin membrane transporting process, a washing solvent is flowed toward the upstream side of the transporting process, and it is preferable to make the purity of the washing solvent in the downstream tank higher than that of the upstream layer. Depending on the required performance of the microporous polyolefin membrane, heat setting may be performed by annealing treatment. Note that the annealing treatment is preferably carried out at 60 to 130° C., and more preferably 70 to 125° C. from the viewpoint of transportability and the like during the process.

The microporous polyolefin membrane of the present invention is produced via the aforementioned steps and is characterized in that impregnation of an aqueous solution with a high surface free energy can be favorably achieved without implementing hydrophilization treatment involving chemical treatment (for example, coating of a surfactant, graft polymerization using a hydrophilic functional group, wetting treatment with a liquid with a low surface free energy, etc.), or physical treatment (for example, plasma treatment, corona treatment, etc.).

By not implementing the aforementioned chemical treatment, mixing of contaminants can be avoided leading to reduced production costs. Furthermore, by not implementing the physical treatment, degradation of the resin and a reduction in dynamic strength can be prevented.

(Application)

The substrate for a composite membrane comprising a microporous polyolefin membrane of the present invention can constitute the composite membrane by carrying a hydrophilic resin compound within the micropores thereof. The composite membrane can be suitably used for clothing, special protective clothing, sanitary goods (e.g., disposable diapers), moisture-permeable waterproof membranes for total heat exchange elements and the like, and electrolyte membranes for solid polymer fuel cells, water electrolysis, and soda decomposition, etc.

EXAMPLES

The examples, comparative examples and various measuring methods of the present invention are described below. However, the present invention is in no way limited by these examples.

(Measuring Methods)
(Polyolefin Mass-Average Molecular Weight)

The mass-average molecular weight was determined by dissolving a sample of the microporous polyolefin membrane in o-dichlorobenzene by heating and measuring the sample by GPC (Alliance GPC 2000, GMH 6-HT and GMH 6-HTL columns, manufactured by Waters) at a column temperature of 135° C. and a flow rate of 1.0 mL/min. Molecular weight monodisperse polystyrene (manufactured by Tosoh Corporation) was used for calibrating the molecular weight.

(Membrane Thickness)

The membrane thickness of the microporous polyolefin membrane was determined by measuring 20 points with a contact type membrane thickness meter (Lightmatic VL-50A, manufactured by Mitutoyo Corporation) and averaging the results. A columnar member having a diameter of 0.5 cm on the bottom surface was used as the contact terminal. During the measurement, adjustments were made such that a load of 0.01 N was applied.

(Average Pore Diameter)

The average pore diameter of the microporous polyolefin membrane was measured by using a perm-porometer (model: CFP-1500 AEX) manufactured by Porous Materials Co., Ltd. and GALWICK (perfluoropolyether with surface tension of 15.9 dyne/cm manufactured by Porous Materials Co., Ltd.) as an impregnating solution. The mean flow pore diameter (nm) was calculated based on the half dry method specified in ASTM E 1294-89. The measurement temperature was 25° C. and the measurement pressure was 200 kPa to 3500 kPa.

(Porosity)

The porosity (ε) of the microporous polyolefin membrane was calculated using the following formula.

$$\varepsilon(\%) = \{1 - Ws/(ds \cdot t)\} \times 100$$

Ws: weight of porous polyolefin membrane (g/m$^2$)
ds: True density of polyolefin (g/cm$^3$)
t: thickness of microporous polyolefin membrane (μm)

Note that, the weight of the microporous polyolefin membrane was determined by cutting out samples of 10 cm×10 cm, measuring the mass thereof, and dividing by the area.

(Contact Angle)

The static contact angle was measured using a fully automatic contact angle meter DMo-701 FE and Interface Measurement and Analysis System FAMAS manufactured by Kyowa Interface Science Co., Ltd as the measuring device. Using a microporous polyolefin membrane which had not undergone hydrophilization treatment, a 4 μL aqueous ethanol solution (industrial ethanol (purity of 95%)/pure water; mixed volume ratio 1/2) was dripped onto the sample and a contact angle θ1 1 second after the dripping and a contact angle θ2 10 minutes after the dripping were measured at normal atmospheric pressure, 24° C. and 60% relative humidity.

(Gurley Value)

The Gurley value (sec/100 cc) of a microporous polyolefin membrane with an area of 642 mm$^2$ was measured according to JIS P8117.

(Tensile Breaking Strength)

A strip-shaped test piece (15 mm in width and 50 mm in length) was pulled at a speed of 200 mm/min with a tensile tester (RTE-1210 manufactured by Orientec Co., Ltd.) to determine the tensile strength when the test piece breaks.

(Rate of Change of Contact Angle)

The rate of change of contact angle was calculated with the following formula using contact angle θ1 and contact angle θ2 which were respectively obtained when the contact angle was measured 1 second and 10 minutes after a liquid was dripped on the surface and was used as an index of permeation speed. For example, when there are two samples with the same contact angle after 1 second, a greater rate of change of contact angle after 10 minutes means the permeation speed is faster.

$$\text{Rate of change of contact angle} = (\theta 1 - \theta 2)/\theta 1 \times 100 (\%)$$

(Permeability of Ethanol and Water Mixture)

Various aqueous ethanol solutions were prepared by mixing pure water with industrial ethanol (purity of 95%) at various volume ratios. A sample was placed on and closely contacted with a piece of paper with which the absorption of water could be easily seen. 10 μL of the prepared aqueous ethanol solution was dripped on the sample, and presence or absence of liquid permeation after dripping at atmospheric pressure at 24° C. and relative humidity of 60% was observed. The liquid permeation was judged by visually checking for wetting of the piece of paper 1 minute after dripping. Note that, when the color of the back side of the piece of paper was discolored, it was judged that complete permeation (o) had occurred, and when it was not discolored, it was judged that no permeation (x) occurred because the droplet had not penetrated to the back side. The maximum water concentration means the highest water concentration among the water concentrations of the permeating liquid droplets of aqueous ethanol solution (note that the ethanol concentration is converted into 100% purity when calculating the water concentration). Also, in Table 2 below, the surface free energy of the aqueous ethanol solution at the maximum water concentration is also shown.

Example 1

A polyethylene composition comprising a mixture of 12 parts by mass of a high molecular weight polyethylene (PE1) with a mass-average molecular weight of 4,600,000, and 3 parts by mass of a low molecular weight polyethylene (PE2) with a mass-average molecular weight of 560,000 was used, and a polyethylene solution was prepared so that the concentration of the total amount of the polyethylene resin was 15% by mass by mixing with a solvent mixture of 72 parts by mass of liquid paraffin and 13 parts by mass of decalin (decahydronaphthalene) which was prepared in advance.

Gel-like sheets (base tape) were produced by extruding this polyethylene solution into sheets using a die at 160° C., cooling the extrudate in a water bath at 25° C. and providing a water stream on the surface layer of the water bath so that the mixed solvent released from the sheet, which gellified in the water bath, and floating on the water surface did not again adhere to the sheet. The base tape was dried for 10 minutes at 55° C. and a further 10 minutes at 95° C. to remove the decalin from within the base tape. Thereafter, the base tape was stretched by a ratio of 5.5 in the longitudinal direction at 100° C., and then stretched by a ratio of 13 in the transverse direction at 110° C. after which heat treatment (heat setting) at 135° C. was immediately carried out.

Next the microporous polyethylene membrane was soaked successively in two separate tanks containing methylene chloride baths for 30 seconds each while liquid paraffin was extracted therefrom. Note that the purity of the washing solvent in the first tank (low)<in the second tank (high), wherein the first tank was on the side where soaking was started and the second tank was on the side where soaking was finished. Thereafter, the microporous polyethylene membrane was obtained by removing the methylene chloride by drying at 45° C., and by carrying out annealing treatment while transporting over rollers heated to 120° C.

The obtained microporous polyethylene membrane had excellent permeability to ethanol/water=1/2 solution and was suitable as a substrate for a composite membrane. Note that Table 1 below indicates the production conditions for the microporous polyethylene membrane and Table 2 indicates the physical property values and evaluation results of the microporous polyethylene membrane. Furthermore, the information regarding the other examples and comparative examples have been similarly collated in Tables 1 and 2.

Example 2

A microporous polyethylene membrane was obtained in the same way as in Example 1 except for the following. A polyethylene composition comprising a mixture of 6 parts by mass of a high molecular weight polyethylene (PE1) with a mass-average molecular weight of 4,600,000, and 24 parts by mass of a low molecular weight polyethylene (PE2) with a mass-average molecular weight of 560,000 was used, and a polyethylene solution was prepared so that the concentration of the total amount of the polyethylene resin was 30% by mass by mixing with a solvent mixture of 6 parts by mass of decalin (decahydronaphthalene) and 64 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 5.5 in the longitudinal direction at 100° C. and then stretched by a ratio of 13 in the transverse direction at 110° C. after which heat treatment (heat setting) at 125° C. was immediately carried out.

The obtained microporous polyethylene membrane has excellent permeability to ethanol/water=1/2 solution and is suitable as a substrate for a composite membrane.

Example 3

A microporous polyethylene membrane was obtained in the same way as in Example 1 except for the following. A polyethylene composition comprising a mixture of 16 parts by mass of a high molecular weight polyethylene (PE1) with a mass-average molecular weight of 4,600,000, and 4 parts by mass of a low molecular weight polyethylene (PE2) with a mass-average molecular weight of 560,000 was used, and a polyethylene solution was prepared so that the concentration of the total amount of the polyethylene resin was 20% by mass by mixing with a solvent mixture of 2 parts by mass of decalin (decahydronaphthalene) and 78 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 3.9 in the longitudinal direction at 100° C. and then stretched by a ratio of 13 in the transverse direction at 100° C. after which heat treatment (heat setting) at 135° C. was immediately carried out.

The obtained microporous polyethylene membrane has excellent permeability to ethanol/water=1/2 solution and is suitable as a substrate for a composite membrane.

Example 4

A microporous polyethylene membrane was obtained in the same way as in Example 1 except for the following. A polyethylene composition comprising a mixture of 16 parts by mass of a high molecular weight polyethylene (PE1) with a mass-average molecular weight of 4,600,000, and 4 parts by mass of a low molecular weight polyethylene (PE2) with a mass-average molecular weight of 560,000 was used, and a polyethylene solution was prepared so that the concentration of the total amount of the polyethylene resin was 20% by mass by mixing with a solvent mixture of 2 parts by mass of decalin (decahydronaphthalene) and 78 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 5 in the longitudinal direction at 100° C., followed by stretching by a ratio of 9 in the transverse direction at 105° C. after which heat treatment (heat setting) at 135° C. was immediately carried out.

The obtained microporous polyethylene membrane has excellent permeability to ethanol/water=1/2 solution and is suitable as a substrate for a composite membrane.

Example 5

The polyethylene solution was prepared in the same way as for Example 1.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 7 in the longitudinal direction at 100° C. and then stretched by a ratio of 13 in the transverse direction at 100° C. after which heat treatment (heat setting) at 135° C. was immediately carried out. Apart from these differences the microporous polyethylene membrane was obtained in the same way as in Example 1.

The obtained microporous polyethylene membrane has excellent permeability to ethanol/water=1/2 solution and is suitable as a substrate for a composite membrane.

Example 6

A microporous polyethylene membrane was obtained in the same way as in Example 1 except for the following. A polyethylene composition comprising a mixture of 6 parts by mass of a high molecular weight polyethylene (PE1) with a mass-average molecular weight of 4,600,000, and 6 parts by mass of a low molecular weight polyethylene (PE2) with a mass-average molecular weight of 560,000 was used, and a polyethylene solution was prepared so that the concentration of the total amount of the polyethylene resin was 12% by mass by mixing with a solvent mixture of 30 parts by mass of decalin (decahydronaphthalene) and 58 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 6.5 in the longitudinal direction at 110° C., and then stretched by a ratio of 15 in the transverse direction at 115° C. after which heat treatment (heat setting) at 138° C. was immediately carried out.

The obtained microporous polyethylene membrane has excellent permeability to ethanol/water=1/2 solution and is suitable as a substrate for a composite membrane.

Comparative Example 1

A microporous polyethylene membrane was obtained in the same way as in Example 1 except for the following. A polyethylene composition comprising a mixture of 3 parts by mass of a high molecular weight polyethylene (PE1) with a mass-average molecular weight of 4,600,000, and 14 parts by mass of a low molecular weight polyethylene (PE2) with a mass-average molecular weight of 560,000 was used, and a polyethylene solution was prepared so that the concentration of the total amount of the polyethylene resin was 17% by mass by mixing with a solvent mixture of 32 parts by mass of decalin (decahydronaphthalene) and 51 parts by mass of paraffin which was prepared in advance.

A gel-like sheet was prepared by extruding this polyethylene solution into sheets using a die at 160° C. then cooling the extrudate in a water bath at 25° C.

The base tape was dried for 10 minutes at 55° C. and for a further 10 minutes at 95° C. to remove decalin from the base tape. Thereafter, the base tape was stretched by a ratio of 5.5 in the longitudinal direction at 90° C., and then stretched by a ratio of 11 in the transverse direction at 105° C. after which heat treatment (heat setting) at 139° C. was immediately carried out.

The obtained microporous polyethylene membrane has a large pore diameter, has poor permeability to ethanol/water=1/2 solution and is not suitable as a substrate for a composite membrane.

Comparative Example 2

A polyethylene composition comprising a mixture of 3 parts by mass of a high molecular weight polyethylene (PE1) with a mass-average molecular weight of 4,600,000, and 27 parts by mass of a low molecular weight polyethylene (PE2) with a mass-average molecular weight of 560,000 was used, and a polyethylene solution was prepared such that the concentration of the total amount of the polyethylene resin was made to be 30% by mass by mixing with 70 parts by mass of decalin (decahydronaphthalene).

A gel-like sheet was prepared by extruding this polyethylene solution into sheets using a die at 160° C. then cooling the extrudate in a water bath at 20° C.

The gel-like sheet was subjected to preliminary (first) drying in a 70° C. atmosphere for 20 minutes, followed by primary (preliminary) stretching in the longitudinal direction by a ratio of 1.5 at room temperature (25° C.). Main drying was performed thereafter for 5 minutes in a 60° C. atmosphere. The remaining solvent in the base tape after the main drying was 20% by mass. After completing the main drying, secondary stretching was performed by stretching the base tape in the longitudinal direction by a ratio of 5.5 at a temperature of 100° C., followed by stretching in the transverse direction by a ratio of 13 at a temperature of 125° C. after which heat treatment (heat setting) at 120° C. was immediately carried out to obtain a biaxially stretched microporous polyethylene membrane.

The obtained microporous polyethylene membrane forms a large contact angle using ethanol/water=1/2 solution, is poorly permeable to an aqueous solution of a hydrophilic resin compound and is not suitable as a substrate for a composite membrane.

Comparative Example 3

A polyethylene composition comprising a mixture of 1.7 parts by mass of a high molecular weight polyethylene with a mass-average molecular weight of 4,600,000, and 19.3 parts by mass of a low molecular weight polyethylene with a mass-average molecular weight of 560,000 was used, and a polyethylene solution was prepared such that the concentration of the total amount of the polyethylene resin was made to be 21% by mass by mixing with 79 parts by mass of decalin (decahydronaphthalene).

A gel-like sheet was prepared by extruding this polyethylene solution into sheets using a die at 170° C. then cooling the extrudate in a water bath at 25° C.

The gel-like sheet was subjected to preliminary (first) drying in a 55° C. atmosphere for 10 minutes, followed by primary (preliminary) stretching in the longitudinal direction by a ratio of 1.6 at 30° C. Main drying was performed thereafter for 5 minutes in a 50° C. atmosphere (amount of remaining solvent was less than 1%). After completing the main drying, secondary stretching was performed by stretching the base tape in the longitudinal direction by a ratio of 3.5 at a temperature of 95° C. and then stretched in the transverse direction by a ratio of 10 at a temperature of 115° C. after which heat treatment (heat setting) at 135° C. was immediately carried out to obtain a biaxially stretched microporous polyethylene membrane.

The obtained microporous polyethylene membrane forms a large contact angle using ethanol/water=1/2 solution, is poorly permeable to an aqueous solution of a hydrophilic resin compound and is not suitable as a substrate for a composite membrane.

Comparative Example 4

A microporous polyethylene membrane was obtained in the same way as in Example 2 other than that the decalin (decahydronaphthalene) was 40 parts by mass and the paraffin was 30 parts by mass.

The obtained microporous polyethylene membrane was used as a substrate for a composite membrane that had a thickness of 6 μm, a porosity of 43%, an average pore diameter of 40 nm, a contact angle θ1 of 71 degrees and a contact angle θ2 of 65 degrees between a droplet and the surface 1 second and 10 minutes after dripping of a mixed solution of ethanol and water (volume ratio 1/2) thereon, respectively, and a rate of change of contact angle of 8%. The obtained microporous polyethylene membrane had a maximum water concentration lower than that of the Examples and was not suitable for a substrate for a composite membrane.

Comparative Example 5

A microporous polyethylene membrane was obtained in the same way as in Example 1 except for the following. 8 parts by mass of a high molecular weight polyethylene (PE1) with a mass-average molecular weight of 2,000,000 was used, and a polyethylene solution was prepared such that the concentration of the total amount of the polyethylene resin was made to be 8% by mass by mixing with 92 parts by mass of paraffin which was prepared in advance.

A gel-like sheet was prepared by extruding this polyethylene solution into sheets using a die at 200° C. then cooling the extrudate in a water bath at 50° C.

The base tape was dried for 10 minutes at 55° C. and for a further 10 minutes at 95° C. to remove water that had stuck to the base tape. Thereafter, the base tape was stretched by a ratio of 4 in the longitudinal direction at 120° C., and then stretched by a ratio of 10 in the transverse direction at 120° C. after which heat treatment (heat setting) at 130° C. was immediately carried out. Next the microporous polyethylene membrane was soaked successively in two separate tanks containing methylene chloride baths for 30 seconds each while liquid paraffin was extracted therefrom. Note that that the purity of the washing solvent in the first tank (low)<in the second tank (high), wherein the first tank was on the side where soaking was started and the second tank was on the side where soaking was finished. Thereafter, the microporous polyethylene membrane was obtained by removing the methylene chloride by drying at 45° C., and carrying out annealing treatment while transporting over rollers heated to 90° C.

TABLE 1

|  |  | Example 1 | Example 2 | Example 3 | Example 4 | Example 5 | Example 6 | Comparative examples 1 | Comparative examples 2 | Comparative examples 3 | Comparative examples 4 | Comparative examples 5 |
|---|---|---|---|---|---|---|---|---|---|---|---|---|
| Composition | Decalin (parts by mass) | 13 | 6 | 2 | 2 | 13 | 30 | 32 | 70 | 79 | 40 | 0 |
|  | Parafin (parts by mass) | 72 | 64 | 78 | 78 | 72 | 58 | 51 | 0 | 0 | 30 | 92 |
|  | PE concentration (% by mass) | 15 | 30 | 20 | 20 | 15 | 12 | 17 | 30 | 21 | 30 | 8 |
|  | PE1 (parts by mass) | 12 | 6 | 16 | 16 | 12 | 6 | 3 | 3 | 1.7 | 6 | 8 |
|  | PE1Mw | 4.6 million | 4.6 million | 4.6 million | 4.6 million | 4.6 million | 4.6 million | 4.6 million | 4.6 million | 4.6 million | 4.6 million | 2 million |
|  | PE2 (parts by mass) | 3 | 24 | 4 | 4 | 3 | 6 | 14 | 27 | 19.3 | 24 | — |
|  | PE2Mw | 560,000 | 560,000 | 560,000 | 560,000 | 560,000 | 560,000 | 560,000 | 560,000 | 560,000 | 560,000 | — |
| Extrusion | Die temperature (° C.) | 160 | 160 | 160 | 160 | 160 | 160 | 160 | 160 | 170 | 160 | 200 |
|  | Cooling temperature (° C.) | 25 | 25 | 25 | 25 | 25 | 25 | 20 | 20 | 25 | 25 | 50 |
| Drying | First drying temperature (° C.) | 55 | 55 | 55 | 55 | 55 | 55 | 55 | 70 | 55 | 55 | 55 |
|  | First drying time (min.) | 10 | 10 | 10 | 10 | 10 | 10 | 10 | 20 | 10 | 10 | 10 |
|  | Second drying temperature (° C.) | 95 | 95 | 95 | 95 | 95 | 95 | 95 | — | — | 95 | 95 |
|  | Second drying time (min.) | 10 | 10 | 10 | 10 | 10 | 10 | 10 | — | — | 10 | 10 |
| Preliminary stretching | Stretching temperature (° C.) | — | — | — | — | — | — | — | 25 | 30 | — | — |
|  | Stretching ratio (ratio) | — | — | — | — | — | — | — | 1.5 | 1.6 | — | — |
| Main drying | Temperature (° C.) | — | — | — | — | — | — | — | 60 | 50 | — | — |
|  | Time (min.) | — | — | — | — | — | — | — | 5 | 5 | — | — |
| Stretching | Longitudinal stretching temperature (° C.) | 100 | 100 | 100 | 100 | 100 | 110 | 90 | 100 | 95 | 100 | 120 |
|  | Longitudinal stretching ratio (ratio) | 5.5 | 5.5 | 3.9 | 5 | 7 | 6.5 | 5.5 | 5.5 | 3.5 | 5.5 | 4 |
|  | Transverse stretching temperature (° C.) | 110 | 110 | 100 | 105 | 100 | 115 | 105 | 125 | 115 | 110 | 120 |
|  | Transverse stretching ratio (ratio) | 13 | 13 | 13 | 9 | 13 | 15 | 11 | 13 | 10 | 13 | 10 |
|  | Heat setting temperature (° C.) | 135 | 125 | 135 | 135 | 135 | 138 | 139 | 120 | 135 | 125 | 130 |
|  | Area ratio (ratio) | 72 | 72 | 51 | 45 | 91 | 98 | 61 | 72 | 35 | 72 | 40 |
| Extracting | Extracting time (sec.) | 60 | 60 | 60 | 60 | 60 | 60 | 60 | — | — | 60 | 60 |
|  | Drying temperature (° C.) | 45 | 45 | 45 | 45 | 45 | 45 | 45 | — | — | 45 | 45 |
|  | Annealing temperature (° C.) | 120 | 120 | 120 | 120 | 120 | 120 | 120 | — | — | 120 | 90 |

TABLE 2

|  | Thickness [um] | Porosity [%] | Average pore size [nm] | Gurley value [sec./100 cc] | Tensile breaking strength MD [Mpa] | Tensile breaking strength TD [Mpa] | Contact angle (degrees) 1 second after | Contact angle (degrees) 10 min. after | Contact angle rate change % |
|---|---|---|---|---|---|---|---|---|---|
| Example 1 | 6 | 66 | 31 | 30 | 150 | 180 | 84 | 49 | 41 |
| Example 2 | 11 | 50 | 20 | 85 | 130 | 220 | 78 | 65 | 17 |
| Example 3 | 5 | 55 | 25 | 70 | 130 | 180 | 73 | 59 | 20 |
| Example 4 | 12 | 55 | 30 | 90 | 140 | 160 | 78 | 57 | 26 |

TABLE 2-continued

| | | | | | | | | | |
|---|---|---|---|---|---|---|---|---|---|
| Example 5 | 6 | 63 | 50 | 36 | 190 | 180 | 63 | 52 | 40 |
| Example 6 | 8 | 78 | 35 | 30 | 55 | 110 | 80 | 45 | 44 |
| Comparative examples 1 | 11 | 58 | 60 | 60 | 25 | 30 | 83 | 60 | 27 |
| Comparative examples 2 | 27 | 88 | 1000 | 3.5 | 10 | 14 | 120 | 114 | 5 |
| Comparative examples 3 | 12 | 85 | 500 | 4 | 7 | 10 | 115 | 108 | 6 |
| Comparative examples 4 | 6 | 43 | 40 | 90 | 120 | 150 | 71 | 65 | 8 |
| Comparative examples 5 | 12 | 80 | 60 | 45 | 45 | 70 | 77 | 70 | 9 |

| | Permeability of ethanol-water solution | | | | | | | | | | | Maximum water concentration | | | Surface free energy of liquid (mJ/m$^2$) |
|---|---|---|---|---|---|---|---|---|---|---|---|---|---|---|---|
| | 30% | 31% | 32% | 33% | 34% | 35% | 36% | 37% | 38% | 39% | 40% | Maximum ET concentration vol % | Actual EtOH wt % | vol % | |
| Example 1 | x | ○ | ○ | ○ | ○ | ○ | ○ | ○ | ○ | ○ | ○ | 29.5% | 23.1% | 70.6% | 36.5 |
| Example 2 | x | x | x | ○ | ○ | ○ | ○ | ○ | ○ | ○ | ○ | 31.4% | 24.6% | 68.7% | 35.8 |
| Example 3 | x | x | x | ○ | ○ | ○ | ○ | ○ | ○ | ○ | ○ | 31.4% | 24.6% | 68.7% | 35.8 |
| Example 4 | x | x | x | x | ○ | ○ | ○ | ○ | ○ | ○ | ○ | 32.3% | 25.4% | 67.7% | 35.4 |
| Example 5 | x | x | ○ | ○ | ○ | ○ | ○ | ○ | ○ | ○ | ○ | 30.4% | 23.9% | 69.6% | 36.2 |
| Example 6 | x | ○ | ○ | ○ | ○ | ○ | ○ | ○ | ○ | ○ | ○ | 29.5% | 23.1% | 70.6% | 36.4 |
| Comparative examples 1 | x | x | x | x | x | x | x | x | x | x | ○ | 38.0% | 29.8% | 62.0% | 33.0 |
| Comparative examples 2 | x | x | x | x | x | x | x | x | x | x | x | 38.0% | 29.8% | 62.0% | 33.0 |
| Comparative examples 3 | x | x | x | x | x | x | x | x | x | x | x | 38.0% | 29.8% | 62.0% | 33.0 |
| Comparative examples 4 | x | x | x | x | x | x | x | x | x | ○ | ○ | 37.1% | 29.1% | 63.0% | 33.5 |
| Comparative examples 5 | x | x | x | x | x | x | x | x | ○ | ○ | ○ | 36.1% | 28.3% | 63.9% | 34.0 |

(Verification by Application in Solid Polymer Fuel Cell)

A substrate for a composite membrane comprising the microporous polyethylene membrane of Example 1 was used to make an electrolyte membrane of a solid polymer fuel cell in which a perfluorosulfonic acid resin was carried in the pores thereof and the effect was verified.

(1) Examination of Solvent Ratio

A substrate for a composite membrane (white opaque membrane) comprising the microporous polyethylene membrane of Example 1 was placed on a glass plate, a mixed solution of water/ethanol was gently dripped from above, and the change in color of the substrate was confirmed. The following three types of mixed solution were used. A: water/ethanol=4/1 (mass ratio), B: water/ethanol=3/1 (mass ratio), and C: water/ethanol=2/1 (mass ratio). As a result, as only the mixed solution C (water/ethanol=2/1 (mass ratio)) changed the color of the substrate to transparent, it could be confirmed that the pores of the substrate were loaded with the mixed solution. Note that the color of the substrate when mixed solutions A and B were used remained an opaque white and so the mixed solution was not loaded into the pores of the substrate. In the following examination, an electrolyte membrane was prepared using the mixed solution C (water/ethanol=2/1 (mass ratio)).

(2) Preparation of Electrolyte Membrane and MEA of Solid Polymer Fuel Cell

A substrate for a composite membrane comprising the microporous polyethylene membrane of Example 1 was used as a substrate and a perfluorosulfonic acid resin (equivalent mass EW=560) was used as the hydrophilic resin compound. A polymer solution was prepared by dissolving perfluorosulfonic acid resin into the mixed solution of water/ethanol=2/1 (mass ratio) such that the polymer concentration was 3.3% by mass. After impregnating the substrate with the polymer solution, drying was performed at room temperature to remove the solvent. Furthermore, after annealing treatment for 13.5 hours at 100° C., washing and drying were performed and an electrolyte membrane (membrane thickness of about 7 μm) made of the composite membrane was obtained.

(Evaluation of Fuel Cell Operation)

A catalyst paste was prepared by putting 10.84 g of a dispersion composition of the perfluorosulfonic acid resin (EW=560), 2.0 g of TKK Pt/C (Tanaka Holdings Co., Ltd., TEC10E50E, platinum loading amount of 45.9%), 8.67 g of RO water, 8.67 g of 1-propanol and 8.67 g of 2-propanol into a zirconia container together with 200 g of zirconia balls (φ 5), and mixing using a planetary ball mill (manufactured by Fritz of Germany) at a rotation speed of 200 rpm for 1 hour.

The electrode catalyst layer was prepared by coating the catalyst paste prepared as described above on a polytetrafluoroethylene (PTFE) sheet with an applicator PI-1210 (Tester Sangyo) and drying in an air atmosphere. The amount of platinum loaded was adjusted to around 0.3 mg/cm$^2$.

The MEA was prepared by sandwiching an electrolyte membrane between two of the aforementioned electrode catalyst layers cut out to 5 cm$^2$, hot-pressing at 135° C. and a pressure of 2.0 kN for 1 minute, then peeling off the PTFE sheet.

Both sides of the MEA were sandwiched between gas diffusion layers (SIGRACET GDL 24 BC, manufactured by SGL GROUP), and assembled into a single cell (catalytic layer area: 5 cm$^2$) made by ElectroChem together with a gasket. The cell temperature was set to 80° C., a water bubbling method was used to control the relative humidity of gas flowing to both electrodes, and two types of electrochemical characteristics were measured. One involved a current interrupt method, in which hydrogen gas was supplied to the anode side and oxygen gas was supplied to the cathode side at flow rates of 100 mL/min and 500 mL/min, respectively, and the relative humidity at both electrodes were simultaneously changed to 60% RH, 30% RH, 20% RH and 10% RH. Using an electrochemical measurement system HZ-3000 (Hokuto Denko Co., Ltd.) with an initial state of 1 A/cm$^2$, a current was passed through the cell for 1 minute and the ohmic resistance was calculated by measuring the voltage change when the current was momentarily interrupted. The second involved I-V characteristic test, in which hydrogen gas was supplied as fuel to the anode side and oxygen gas or air was supplied as an oxidizing agent to the cathode side at flow rates of 100 mL/min and 500 mL/min, respectively, and the relative humidity at both electrodes were simultaneously changed to 30% RH, 20% RH, 10% RH. The cell voltage was measured when the current was driven from 0 to 10 A with a battery charging and discharging device HJ 1010 SMSA (Hokuto Denko Corporation).

FIG. 1 shows, with respect to the MEA acquired as described above, the results of calculating the degree of proton conductivity of the MEA by calculating the ohmic resistance with a current interrupter. As a reference example, Nafion NR 211 (membrane thickness of 25 μm) was used, which is an electrolyte membrane manufactured by Du Pont. As shown in FIG. 1, with respect to proton conductivity, in addition to the effect of thinning the membrane thickness to about one quarter, as a low EW perfluorosulfonic acid polymer having a high proton conductivity is loaded therein, the MEA prepared using the substrate of the present invention showed higher performance than when NR 211 was used.

Figure 2:
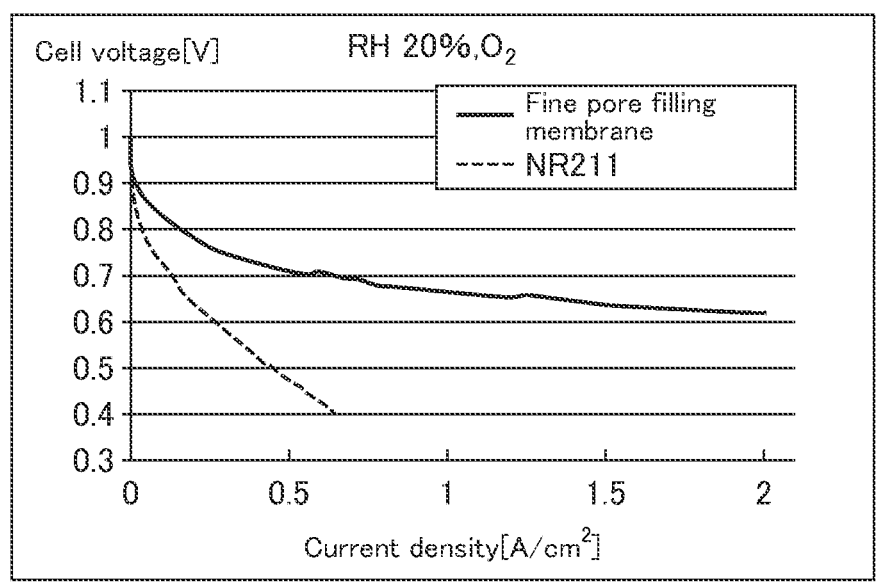
FIG. 2 is a graph comparing the current density dependency of cell voltage of the MEA that uses the substrate for a composite membrane of the present invention and a conventional electrolyte membrane.
Figure 2:
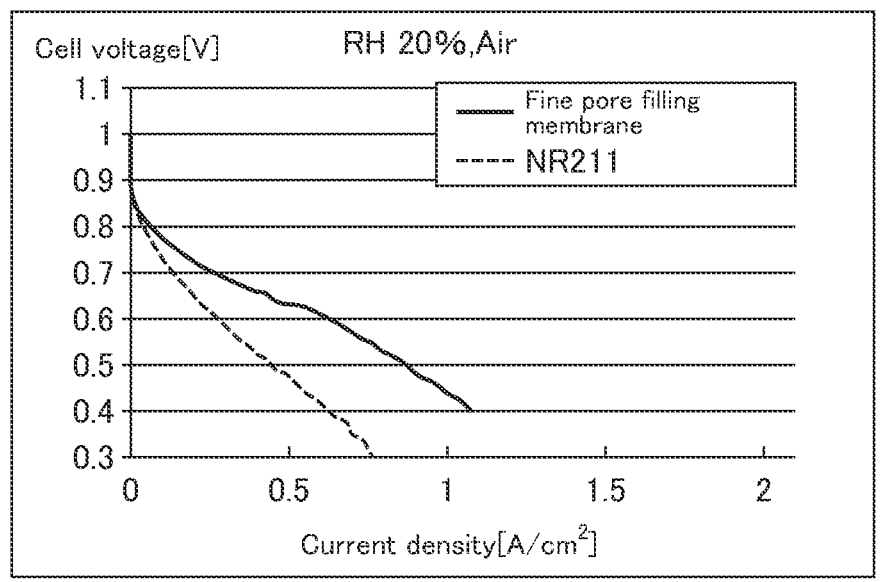

FIG. 2 shows the relationship between the cell voltage and the current density in the MEA obtained as described above at a humidity of 20% or less (oxidizing agent: O$_2$ or air). As a reference example, Nafion NR 211 (membrane thickness of 25 μm) was used, which is an electrolyte membrane manufactured by Du Pont. As shown in FIG. 2, in a low humidity environment of 20% humidity, almost no electricity generation was possible with the conventional NR 211, whereas the MEA produced using the substrate of the present invention could generate electricity at up to 2 A/cm$^2$. Thus, it is understood that a novel electrolyte membrane was obtained. Based on the fact that a low EW perfluorosulfonic acid polymer (EW 560) having a high proton conductivity was used for the ionomer in the catalyst layer, that an electrolyte membrane was prepared by loading the microporous polyolefin membrane with the electrolyte of EW 560, and that the electrolyte membrane was thinned, it is considered that water generated at the cathode could sufficiently permeate to the anode side of the electrolyte membrane so that the humidity inside the electrolyte membrane could be maintained.

INDUSTRIAL APPLICABILITY

The substrate for a composite membrane according to the present invention has industrial applicability in that as the pores of the substrate can be suitably loaded with a perfluorosulphonic acid type resin to obtain a very thin composite membrane, a novel electrolyte membrane capable of generating electricity even under low humidity environments which has more excellent proton conductivity than before can be provided.

What is claimed is:

1. A composite membrane comprising a microporous polyolefin membrane and a hydrophilic resin compound carried within pores of the microporous polyolefin membrane wherein:
    the average pore size of the microporous polyolefin membrane is 1 nm to 50 nm;
    the porosity of the microporous polyolefin membrane is 50% to 78%;
    the Gurley value as measured according to JIS P8117 is 90 s/100 cc or less; and
    the membrane thickness of the microporous polyolefin membrane is 1 μm to 10 μm.
2. The composite membrane according to claim 1, wherein when a mixed solution of ethanol and water (volume ratio 1/2) is dripped onto a surface of the microporous polyolefin membrane which has not undergone hydrophilization treatment, a contact angle θ1 between the droplet and the surface is 0 to 90 degrees 1 second after the dripping, and a contact angle θ2 between the droplet and the surface is 0 to 70 degrees 10 minutes after the dripping.
3. The composite membrane according to claim 2, wherein the rate of change of the contact angle ((θ1−θ2)/θ1×100) is 10 to 50%.
4. The composite membrane according to claim 1, wherein the porosity of the microporous polyolefin membrane is 60% to 78%.
5. The composite membrane according to claim 1, wherein the polyolefin is a polyethylene composition comprising a high molecular weight polyethylene with a mass average molecular weight of 900,000 or more and a low molecular weight polyethylene with a mass average molecular weight of 200,000 to 800,000 mixed at a mass ratio of 20:80 to 80:20.
6. The composite membrane according to claim 1, wherein the microporous polyolefin membrane can be impregnated with a liquid which is a solvent for the hydrophilic resin compound and has a surface free energy of 35 to 36.5 mJ/m$^2$.
7. The composite membrane according to claim 6, wherein the microporous polyolefin membrane can be impregnated with a mixture of ethanol and water in which the water concentration is greater than 65.8% by volume to 70.6% by volume or less.
8. The composite membrane according to claim 1, wherein the tensile breaking strength (MD or TD) per unit cross sectional area of the polyolefin solid content of the microporous polyolefin membrane is 50 MPa or more.

9. The composite membrane according to claim 1, wherein the membrane thickness is 1 µm to 6 µm.

* * * * *